(12) United States Patent  (10) Patent No.: US 7,417,799 B2
Roth  (45) Date of Patent: Aug. 26, 2008

(54) MULTI-PRIMARY COLOR DISPLAY

(75) Inventor: Shmuel Roth, Petach Tikva (IL)

(73) Assignee: Genoa Color Technologies Ltd., Herzliya (IL)

( * ) Notice: Subject to any disclaimer, the term of this patent is extended or adjusted under 35 U.S.C. 154(b) by 60 days.

(21) Appl. No.: 10/566,628

(22) PCT Filed: Aug. 3, 2004

(86) PCT No.: PCT/IL2004/000711

§ 371 (c)(1),
(2), (4) Date: Feb. 1, 2006

(87) PCT Pub. No.: WO2005/013193

PCT Pub. Date: Feb. 10, 2005

(65) Prior Publication Data

US 2006/0285217 A1  Dec. 21, 2006

Related U.S. Application Data

(60) Provisional application No. 60/491,965, filed on Aug. 4, 2003.

(51) Int. Cl.
*G02B 27/14* (2006.01)
(52) U.S. Cl. .................... 359/634; 353/52; 353/57; 353/58; 348/748
(58) Field of Classification Search ............... 359/634; 353/52, 57, 58; 348/748
See application file for complete search history.

(56) References Cited

U.S. PATENT DOCUMENTS

| 2,790,844 | A | 4/1957 | Neugebauer |
| 3,699,244 | A | 10/1972 | Cohen et al. |
| 4,390,893 | A | 6/1983 | Russell et al. |
| 4,751,535 | A | 6/1988 | Myers |
| 4,800,375 | A | 1/1989 | Silverstein et al. |
| 4,843,381 | A | 6/1989 | Baron |
| 4,843,573 | A | 6/1989 | Taylor et al. |
| 4,892,391 | A | 1/1990 | Stewart et al. |
| 4,952,972 | A | 8/1990 | Someya |

(Continued)

FOREIGN PATENT DOCUMENTS

EP  0 367 848  5/1990

(Continued)

OTHER PUBLICATIONS

U.S. Appl. No. 09/710,895, filed Nov. 14, 2000, David et al.

(Continued)

*Primary Examiner*—Hung X. Dang
*Assistant Examiner*—Vipin M Patel
(74) *Attorney, Agent, or Firm*—Pearl Cohen Zedek Latzer, LLP

(57) ABSTRACT

A device (300) to produce a color image using four or more primary colors. The device may include four or more transmissive spatial light modulators (309, 310, 311, 312) to modulate four or more, respective, light beams in accordance with four or more, respective, primary color image components of the color image to produce four or more, respective, modulated light beams. The device may also include a beam combining arrangement (320) to combine the four or more modulated light beams into a combined light beam carrying the color image.

18 Claims, 11 Drawing Sheets

U.S. PATENT DOCUMENTS

| | | | |
|---|---|---|---|
| 4,985,853 | A | 1/1991 | Taylor et al. |
| 4,994,901 | A | 2/1991 | Parulski et al. |
| 5,042,921 | A | 8/1991 | Sato et al. |
| 5,087,610 | A | 2/1992 | Hed |
| 5,166,755 | A | 11/1992 | Gat |
| 5,184,114 | A | 2/1993 | Brown |
| 5,191,450 | A | 3/1993 | Yajima et al. |
| 5,214,418 | A | 5/1993 | Fukumura et al. |
| 5,233,183 | A | 8/1993 | Field |
| 5,233,385 | A | 8/1993 | Sampsell |
| 5,243,414 | A | 9/1993 | Dalrymple et al. |
| 5,416,890 | A | 5/1995 | Beretta |
| 5,447,811 | A | 9/1995 | Buhr et al. |
| 5,455,600 | A | 10/1995 | Friedman et al. |
| 5,526,140 | A | 6/1996 | Rozzi |
| 5,563,621 | A | 10/1996 | Silsby |
| 5,592,188 | A | 1/1997 | Doherty et al. |
| 5,614,925 | A | 3/1997 | Braudaway et al. |
| 5,631,734 | A | 5/1997 | Stern et al. |
| 5,642,176 | A | 6/1997 | Abukawa et al. |
| 5,650,942 | A | 7/1997 | Granger |
| 5,657,036 | A | 8/1997 | Markandey et al. |
| 5,724,062 | A | 3/1998 | Hunter |
| 5,736,754 | A | 4/1998 | Shi et al. |
| 5,740,334 | A | 4/1998 | Lin et al. |
| 5,751,385 | A | 5/1998 | Heinze |
| 5,835,099 | A | 11/1998 | Marimont |
| 5,841,494 | A | 11/1998 | Hall |
| 5,844,540 | A | 12/1998 | Terasaki |
| 5,844,699 | A | 12/1998 | Usami et al. |
| 5,854,883 | A | 12/1998 | Madeley |
| 5,863,125 | A | 1/1999 | Doany |
| 5,870,530 | A | 2/1999 | Balasubramanian |
| 5,872,898 | A | 2/1999 | Mahy |
| 5,892,891 | A | 4/1999 | Dalal et al. |
| 5,909,227 | A | 6/1999 | Silverbrook |
| 5,982,347 | A | 11/1999 | Shigeta et al. |
| 5,982,541 | A | 11/1999 | Li et al. |
| 5,999,153 | A | 12/1999 | Lind et al. |
| 6,018,237 | A | 1/2000 | Havel |
| 6,058,207 | A | 5/2000 | Tuijn et al. |
| 6,069,601 | A | 5/2000 | Lind et al. |
| 6,072,464 | A | 6/2000 | Ozeki |
| 6,097,367 | A | 8/2000 | Kuriwaki et al. |
| 6,144,420 | A | 11/2000 | Jung |
| 6,147,720 | A | 11/2000 | Guerinot et al. |
| 6,191,826 | B1 | 2/2001 | Murakami et al. |
| 6,198,512 | B1 | 3/2001 | Harris |
| 6,220,710 | B1 | 4/2001 | Raj et al. |
| 6,231,190 | B1 | 5/2001 | Dewald |
| 6,236,390 | B1 | 5/2001 | Hitchcock |
| 6,236,406 | B1 | 5/2001 | Li |
| 6,239,783 | B1 | 5/2001 | Hill et al. |
| 6,246,396 | B1 | 6/2001 | Gibson et al. |
| 6,256,073 | B1 | 7/2001 | Pettitt |
| 6,259,430 | B1 | 7/2001 | Riddle et al. |
| 6,262,710 | B1 | 7/2001 | Smith |
| 6,262,744 | B1 | 7/2001 | Carrein |
| 6,280,034 | B1 | 8/2001 | Brennesholtz |
| 6,304,237 | B1 | 10/2001 | Karakawa |
| 6,324,006 | B1 | 11/2001 | Morgan |
| 6,366,291 | B1 | 4/2002 | Taniguchi et al. |
| 6,380,961 | B1 | 4/2002 | Van Der Loop et al. |
| 6,388,648 | B1 | 5/2002 | Clifton et al. |
| 6,407,766 | B1 | 6/2002 | Ramanujan et al. |
| 6,456,301 | B1 | 9/2002 | Huang |
| 6,459,425 | B1 | 10/2002 | Holub et al. |
| 6,467,910 | B1 | 10/2002 | Sato |
| 6,538,742 | B1 | 3/2003 | Ohsawa |
| 6,570,584 | B1 | 5/2003 | Cok et al. |
| 6,580,482 | B1 | 6/2003 | Hiji et al. |
| 6,594,387 | B1 | 7/2003 | Pettitt et al. |
| 6,633,302 | B1 | 10/2003 | Ohsawa et al. |
| 6,750,992 | B1 | 6/2004 | Holub |
| 6,870,523 | B1 | 3/2005 | Ben-David et al. |
| 6,972,736 | B1 | 12/2005 | Wada et al. |
| 7,113,152 | B2 | 9/2006 | Ben-David et al. |
| 7,129,955 | B2 | 10/2006 | Motomura |
| 7,198,371 | B2 * | 4/2007 | Ishizaka et al. ............... 353/20 |
| 2002/0005829 | A1 | 1/2002 | Ouchi |
| 2002/0109821 | A1 | 8/2002 | Huibers et al. |
| 2002/0122019 | A1 | 9/2002 | Baba et al. |
| 2002/0149546 | A1 | 10/2002 | Chorin et al. |
| 2002/0163526 | A1 | 11/2002 | Haseltine et al. |
| 2002/0167528 | A1 | 11/2002 | Edje |
| 2002/0186229 | A1 | 12/2002 | Brown |
| 2003/0085906 | A1 | 5/2003 | Elliott et al. |
| 2004/0070736 | A1 * | 4/2004 | Roddy et al. ................... 353/31 |
| 2004/0075817 | A1 * | 4/2004 | Agostinelli et al. ........... 353/34 |
| 2004/0130682 | A1 * | 7/2004 | Tomita ........................ 353/31 |
| 2007/0001994 | A1 | 1/2007 | Roth |

FOREIGN PATENT DOCUMENTS

| | | |
|---|---|---|
| EP | 0426113 | 5/1991 |
| EP | 0537887 | 4/1993 |
| EP | 0547603 | 6/1993 |
| EP | 0 653 879 | 5/1995 |
| JP | 59-159131 | 9/1984 |
| JP | 60 263122 | 12/1985 |
| JP | 62-222774 | 9/1987 |
| JP | 07-043658 | 2/1995 |
| JP | 8-86994 | 4/1996 |
| JP | 08-248410 | 9/1996 |
| JP | 09 251160 | 9/1997 |
| JP | 10 307205 | 11/1998 |
| JP | 2000338950 | 12/2000 |
| JP | 2002149148 | 5/2002 |
| WO | WO 95/10160 | 4/1995 |
| WO | WO 97/42770 | 11/1997 |
| WO | WO 99/10866 | 3/1999 |
| WO | WO 97/35424 | 9/1999 |
| WO | 2000253263 | 9/2000 |
| WO | WO 01/48551 | 7/2001 |
| WO | WO 01/95544 | 12/2001 |
| WO | WO 02/11112 | 2/2002 |
| WO | WO 02/50763 | 6/2002 |
| WO | WO 02/091299 | 11/2002 |
| WO | WO 02/091348 | 11/2002 |
| WO | WO 02/091349 | 11/2002 |
| WO | W0 02/101644 | 12/2002 |
| WO | WO 02/099557 | 12/2002 |
| WO | WO 03/058587 | 7/2003 |

OTHER PUBLICATIONS

Ajito et al., "Multiprimary Color Display for Liquid Crystal Display Projectors Using Diffraction Granting", Optical Eng. 38(11) 1883-1868 (Nov. 1999).

Pointer, M. R., "The Gamut of Real Surface Colors", Color Research & Appl. 5(3): 145-155, 1980.

"A critical view of Spectral Models Applied to Binary Color Printing", Wyble and Berns, Color Research and Application, vol. 25, 2000, pp. 4-19.

Rosen et al., "Spectral Reproduction from Scene to Hardcopy II", Image Processing. Munsell Color Science Laboratory, RIT-Proceedings of SPIE vol. 4300 (2001), pp. 33-41.

Gunter Wyszecki and W.S. Stiles, Color Science: Concepts and methods, Quantative Data and Formulae, 2d Ed., 1982, pp. 179-183.

Keith Jack, Video Demystified, 3rd Edition, LLH Technology Publishing 2001 (pp. 215-219).

International Search Report for Application No. PCT/IL02/00594 mailed Dec. 13, 2002.

International Search Report for Application No. PCT/IL04/00711 mailed Jul. 14, 2005.

Ajito et al., "Color Conversion Method for Multiprimary Display Using Matrix Switching", Optical Review, vol. 9, No. 3 (Dec. 2001), 191-197.

Sugiura, T., 11.4: Invited Paper: "EBU Color Filter for LCDs", Toppan Printing Co., Japan, SID, 2001, pp. 146-1493.

Hiyama et al., "LN-3: Four-Primary Color 15-in. XGA TFT-LCD with Wide Color Gamut", Japan, Eurodisplay 2002, pp. 827-830.

Supplementary European Search Report for Application No. EP 03 74 1035 dated Dec. 1, 2005.

European Office Action for Application No. EP 03 741 035 dated Dec. 7, 2006.

Supplementary European Search Report for Application No. EP 03 70 6857 completed Sep. 20, 2006.

Betrisey et al., "20.4: Displaced Filtering for Patterned Displays", Microsoft Corporation, Society for Information Display, 2000, SID, pp 1-4.

Daly, Scott, "47.3: Analysis of Subtriad Addressing Algorithms by Visoal System Models" Center for Displayed Appearance, Sharp Laboratoris of America, Camas, WA, USA, 2001, SID, pp. 1200-1203.

Klompenhouwer et al., "13.4: Subpixel Image Scalling for Color Matrix Displays", Phillips Research Laboratories, Einhoven, The Netherlands, 2002, SID, pp. 176-179.

Credelle et al., "9-2: MTF of High-Resolution Pen Tile Matrix Displays", Eurodisplay 2002, pp. 159-162.

Sugiura et al., "P-24: LCD Module Adopting a Color Conversion Circuit", Japan, SID, 2002, pp. 288-291 No date.

International Search Report for Application No. PCT/IL03/00307 mailed Sep. 11, 2003.

International Search Report for Application No. PCT/IL03/00020 Jul. 2, 2003.

Supplementary European Search Report for Application No. EP 02 73 3203 completed Sep. 26, 2005.

Yamada et al., "12.1: LED Backlight for LCDs", IBM Research, Tokyo Research Laboratory, Yamato, Japan, 1998, SID, pp. 1-4.

"Parameter Values for the HDTV Standards for Production and International Programme Exchange", rec. ITU-R BT.709-3, (1990-1994-1995-1998), pp. 1-28.

International Search Report for Application No. EP 04 01 1262 mailed Oct. 25, 2005.

European Office Action for Application No. EP 2 751 594.9 dated Jul. 30, 2007.

European Search Report for Application No. EP 02 751 59439 dated Feb. 1, 2007.

Chinese Office Action for Application No. CN 038228092 mailed Jun. 29, 2007.

International Search Report for Application No. PCT/IL03/00610 mailed Feb. 19, 2004.

Indian Office Action for Application No. I 229/CHEN/2005 mailed Aug. 24, 2006.

Office Action for U.S. Appl. No. 10/491,726 dated May 18, 2007.

Office Action for U.S. Appl. No. 10/491,726 dated Jul. 2, 2007.

Shimizu, "Invited Paper: Scrolling Color LCOS for HDTV Rear Projection", SID -01 Digest, pp. 1072-1075.

Imai, "Spectral Reporduction from Scent to Hardcopy, Part 1-Multispectral Acquisition and Spectral Estimation using a Trichromatic Digital Camera System Associated with Absorption Filters", Munsell Color Science Laboratory, Rochester Institute of Technology; 2000.

Ajito et al., "Expanded Color Gamut Reproduced by Six-primary Projection Display", Proc. SPIE, vol, 2954 (2000) pp.130-37.

Horibe et al., "High-Efficiency and High Visual Quality LCD Backlighting system", Faculty of Science and Technology, Keio University, Japan, pp. 1-4; 1998.

Yamaguchi et al., "Color Image Reproduction Based on the Multispectral and Multiprimary Imaging: Experimental Evaluation", Device Independent Color, Color Hardcopy and Applications VIII, Proc SPIE, vol. 4663, pp. 15-26; 2002.

Platt, "Optimal Filtering for Patterned Displays", Microsoft Research, pp. 1-4; Signal Processing Letters IEEE; vol. 7; Issue 7; 2000.

Takatori et al., "Field-Sequential Smectic LCD with TFT Pixel Amplifier", Functional Devices Research Labs, NEC Corp., Kawasaki, Kanagawa 216-8555, Japan, SID 02 Digest, pp. 48-51; 2001.

Elliott et al., "Co-Optimization of Color AMLCD Subpixel Architecture and Rendering Algorithms", ClairVoyante Llaboratories, USA and AMLCD, semiconductor Business, Korea, pp. 1-4.

Elliott, "Active Matrix Display Layout Optimization for Sub-pixel Image Rendering", ClairVoyante Laboratories, USA, pp. 1-5; 2000.

* cited by examiner

MULTI-PRIMARY COLOR DISPLAY

CROSS-REFERENCE TO RELATED APPLICATIONS

This Application is a National Phase Application of International Application No. PCT/IL2004/00711, International Filing Date Aug. 3, 2004, which claims priority of U.S. Provisional Patent Application, 60/491,965, filed Aug. 4, 2003.

FIELD OF THE INVENTION

The invention relates generally to color display devices and methods of displaying color images and, more particularly, to multi-primary color displays using transmissive Spatial Light Modulators (SLMs).

BACKGROUND

Various types of color display technologies are known in the art. For example, there are CRT display systems, LCD systems, and projection display systems. In front projection displays, the projected images are viewed from a reflective viewing screen. In rear projection displays, the projected images are viewed through a transmissive viewing screen.

To produce color images, existing display devices use three primary colors, typically, red green and blue, collectively referred to as RGB. In simultaneous projection display systems, the three primary color components of the image are modulated and displayed simultaneously using one or more SLMs.

FIG. 1 schematically illustrates an optical configuration of a RGB display device 100 implementing three transmissive Liquid Crystal Display (LCD) panels to produce a color image. The device includes an illumination unit 101 and a dichroic mirror 102 to reflect the part of the light produced by unit 101 having a blue spectrum, and to transmit the other parts of the light. The reflected blue light is further reflected by a mirror 104 and passes through a transmissive LCD panel 107 according to a pattern corresponding to a blue component of the image. A dichroic mirror 103 reflects the part of the light transmitted by mirror 102 having a green spectrum and transmits the other parts of the light. The reflected green light passes through a LCD panel 108 according to a pattern corresponding to a green component of the image. The part of the light transmitted by mirror 103, is further reflected by mirrors 105 and 106 and passes through a LCD panel 109 according to a pattern corresponding to a red component of the image. An X-cube 110 combines the light transmitted by panels 107, 108 and 109 to form a combined light beam. The combined light beam is projected on a screen by a projection lens 111. The device may include narrow band filters in order to increase saturation of the colors. However, the use of the narrow band color filters will provide a decreased brightness of the display.

SUMMARY OF SOME EMBODIMENTS OF THE INVENTION

Embodiments of the present invention provide a multi-primary color display device, e.g., a color projection display device, for producing a color image using four or more primary colors.

According to some exemplary embodiments of the present invention the display device may include four or more transmissive spatial light modulators to modulate four or more, respective, light beams in accordance with four or more, respective, primary color image components of the color image to produce four or more, respective, modulated light beams.

According to some exemplary embodiments of the invention, the display device may also include a beam combining arrangement to combine the four or more modulated light beams into a combined light beam carrying the color image.

According to some exemplary embodiment, at least one of the transmissive spatial light modulators may include a transmissive liquid crystal display panel.

According to some exemplary embodiments, the four or more light beams may include four or more, respective, primary color light beams having spectral ranges corresponding to the four or more primary colors, respectively.

According to some exemplary embodiments, the device may include a spectrum-splitting arrangement to split light of an illumination source into the four or more primary color light beams. The spectrum-splitting arrangement may include, for example, a plurality of dichroic mirrors to separate light of the illumination source into said four or more primary color light beams. The device may additionally or alternatively include one or more folding mirrors to direct one or more of the four or more primary color light beams onto one or more of the spatial light modulators.

According to some exemplary embodiments, the combining arrangement may include an X-cube to combine three of the four or more modulated light beams into a three-color light beam, and a dichroic cube to combine a fourth modulated light beam of the four or more modulated light beams with the three-color light beam. For example, the X-cube may include two dichroic-coated surfaces, and/or the dichroic cube may include a dichroic-coated surface.

According to some exemplary embodiments, the combining arrangement may include a prism block including five optical elements, each optical element having at least one dichroic-coated surface.

According to some exemplary embodiments, the combining arrangement may include a prism block having a first dichroic-coated surface to combine first and second modulated light beams of the four or more modulated light beams into a first two-color light beam, and a second dichroic-coated surface to combine third and fourth modulated light beams of the four or more modulated light beams into a second two-color light beam. According to some embodiments, the prism block may also include, for example, a third dichroic-coated surface adapted to combine the first and second two-color light beams. According to other embodiments, the prism block may include a dichroic-coating X-configuration adapted to combine the first and second two-color light beams.

According to some exemplary embodiments, the four or more primary colors may include five or more primary colors, the four or more spatial light modulators may include five or more spatial light modulators, respectively, and the combining arrangement may include a prism block having a first dichroic-coated surface to combine the modulated light beams of first and second modulators of the five or more modulators into a first two-color light beam, a second dichroic-coated surface to combine the modulated light beams of third and fourth modulators of the five or more modulators into a second two-color light beam, and a dichroic-coating X-configuration adapted to combine the first and second two-color light beams and the modulated light beam of a fifth spatial light modulator of the five or more spatial light modulators.

According to some exemplary embodiments of the invention, the four or more modulated light beams may travel substantially the same distance in the combining arrangement.

According to some exemplary embodiments of the invention, the device may include a projection lens to project the combined light beam onto a screen. According to some embodiments of the invention, the device may include a controller able to separately activate each of the four or more spatial light modulators to produce four or more transmissive patterns corresponding to four or more primary components, respectively, of a signal representing the color image. The device may also include a converter to convert a three-primary color input signal into the signal representing the color image.

According to some exemplary embodiments of the invention, a method of producing a color image using four or more primary colors may include modulating four or more primary color light beams using four, respective, transmissive spatial light modulators in accordance with four or more, respective, primary color image components of the color image to produce four or more, respective, modulated light beams, and combining the four or more modulated light beams into a combined light beam carrying the color image.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
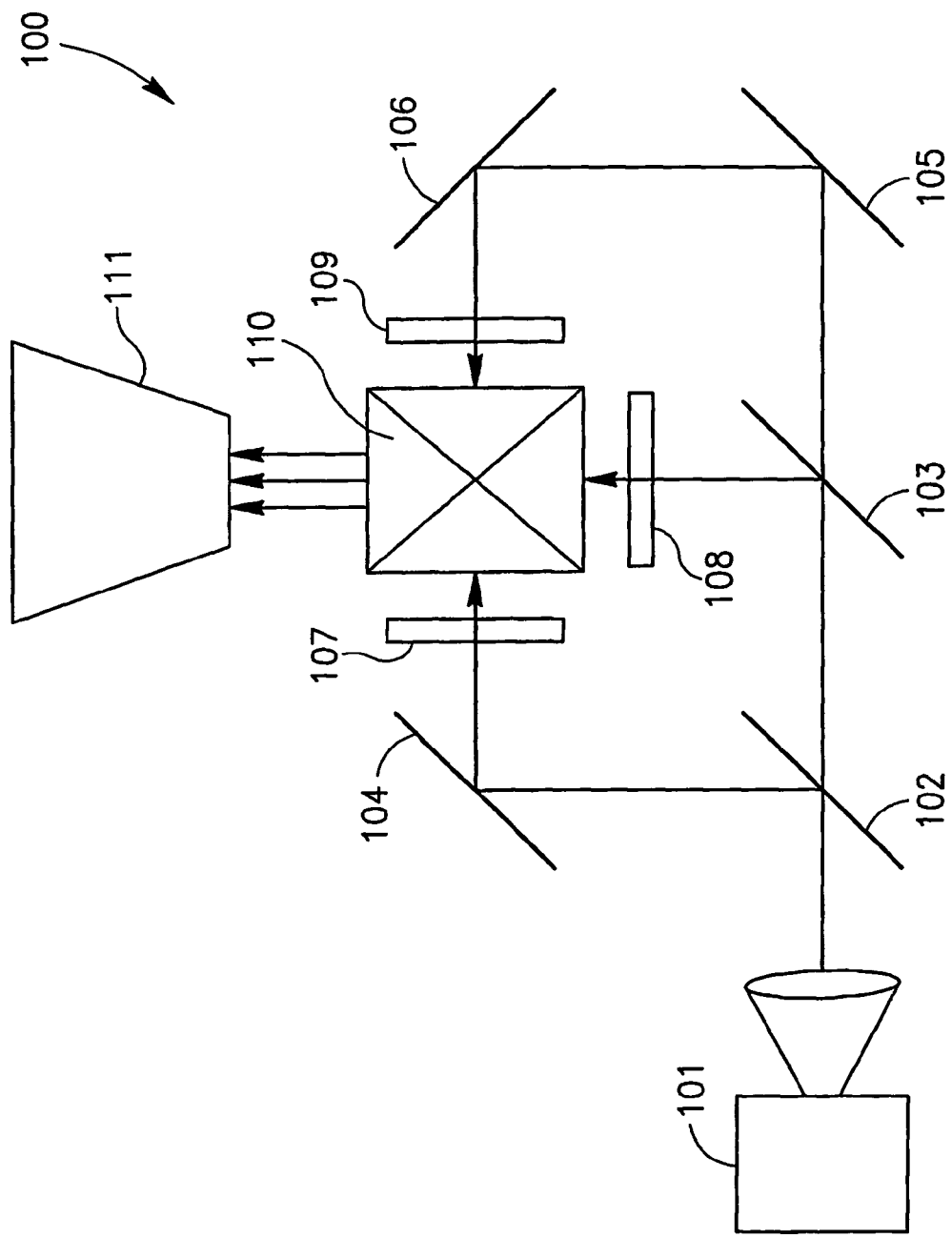
FIG. 1 is a schematic illustration of an optical configuration of a conventional RGB display device.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Figure 2:
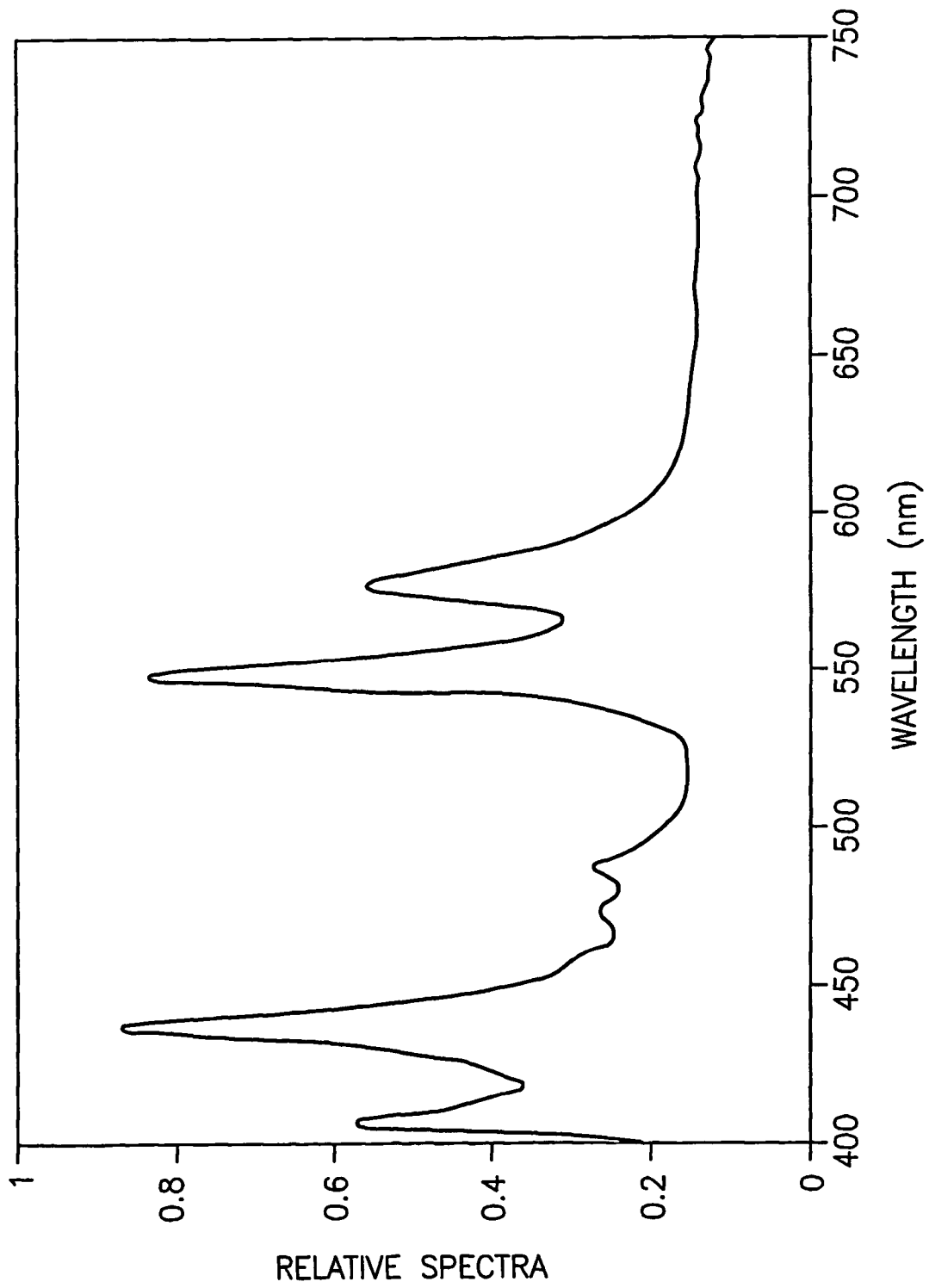
FIG. 2 is a schematic illustration of the spectral output of a conventional high-pressure mercury lamp.

The following description of exemplary embodiments of the invention relates to a projection display system using a high-pressure mercury lamp, e.g., a UHP™ 100; Watt lamp, available from Philips Lighting, a division of Royal Philips Electronics of Eindhoven, Netherlands ("Philips UHP"), or any other suitable light source having a similar spectral range. FIG. 2 schematically illustrates the spectral output of the Philips UHP lamp. It will be appreciated that other types of high-pressure mercury lamps may have similar spectra and/or similar designs, and therefore the following examples may apply to many other types of lamps, for example, the VIP lamp available from Osram of Berlin, Germany.

The examples herein are described in the context of high-pressure mercury type lamps because such lamps are commonly used in projection display devices. However, other types of light sources, for example, Xenon (Xe) type light sources, as are known in the art, may be used.

Embodiments of monitors and display devices with more than three primaries, in accordance with exemplary embodiments of the invention, are described in U.S. patent application Ser. No. 09/710,895, entitled "Device, System And Method For Electronic True Color Display", filed Nov. 14, 2000, and in International Application PCT/IL03/00610, filed Jul. 24, 2003, entitled "High Brightness Wide Gamut Display" and published Jan. 29, 2004 as PCT Publication WO 2004/010407, the disclosures of which are incorporated herein by reference.

Figure 3:
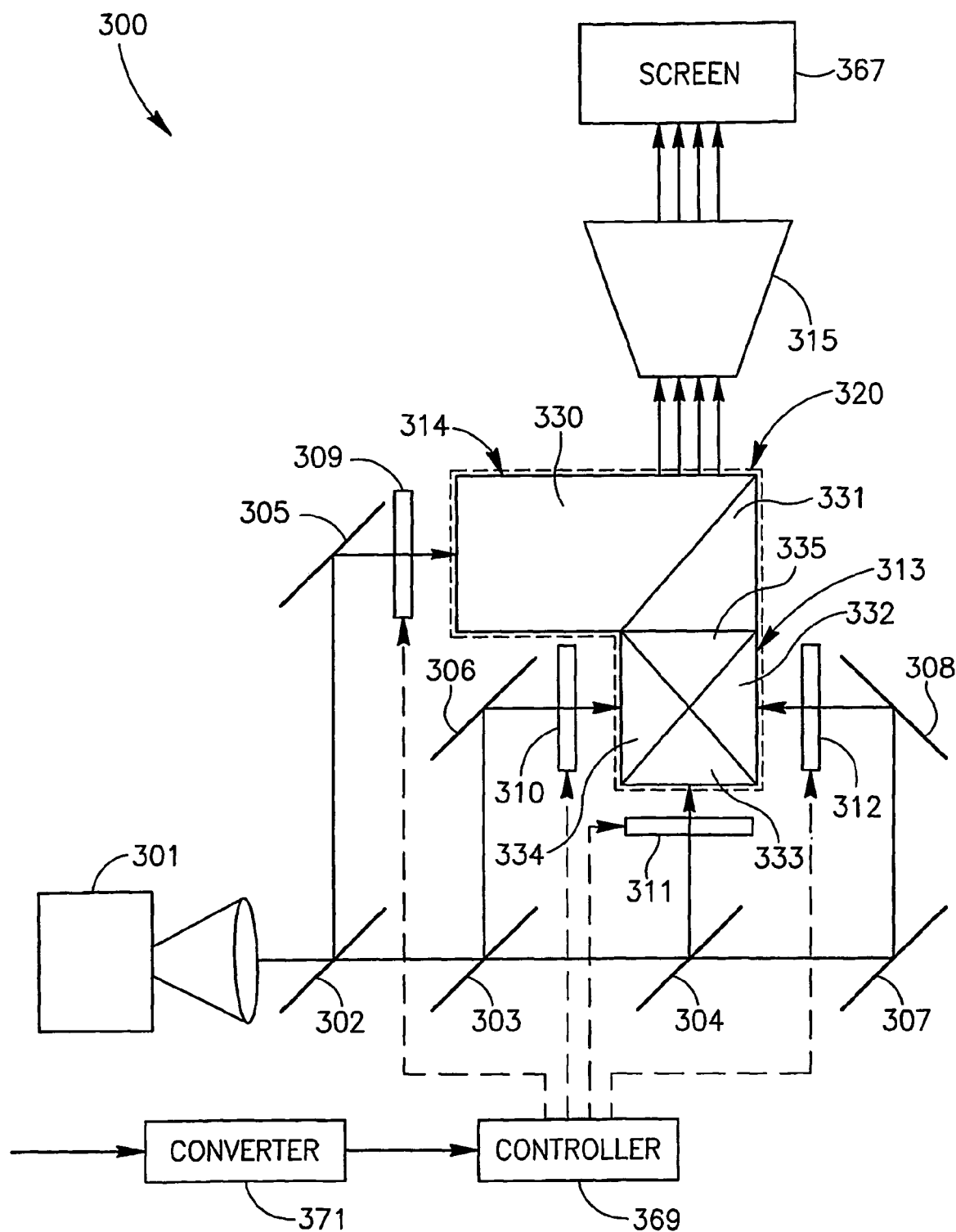
FIG. 3 is a schematic illustration of an optical configuration of a four primary color display device including a combining arrangement in accordance with an exemplary embodiment of the invention.

FIG. 3 schematically illustrates an optical configuration of a display device 300 in accordance with some exemplary embodiments of the invention. The exemplary configuration of FIG. 3 is particularly adapted for devices using four transmissive Spatial Light Modulators (SLMs), e.g., transmissive Liquid Crystal Display (LCD) panels, wherein each panel may produce one primary-color image component, as described below.

Device 300 may include an illumination unit 301, which may include any suitable light source known in the art, e.g., a white light source as described above. Illumination unit 301 may also include a polarization conversion element (not shown) as is known in the art, to provide a desired linear polarized light beam.

Device 300 may also include an arrangement, e.g., including three dichroic mirrors 302, 303 and 304, and four folding mirrors 305, 306, 307 and 308, for splitting the light of illumination unit 301 into four primary-color light beams and directing, e.g., reflecting, the four primary color light beams to four transmissive SLMs, e.g., four transmissive LCD panels 309, 310, 311, and 312, respectively, as described below.

It will be appreciated by those skilled in the art that that any other arrangement may be used for producing and/or spatially modulating the four primary-color light beams. For example, any suitable SLM configuration may be used instead of LCD panels 309, 310, 311 and/or 312. Additionally or alternatively, any suitable splitting arrangement may be implement to split the light of illumination unit 301 into two or more of the four primary-color light beams and/or to respectively direct the primary color light beams onto the SLMs.

Device 300 may additionally include a combining arrangement 320 to combine modulated primary-color light beams transmitted by panels 309, 310, 311, and 312 into a combined light beam, as described below. The combined light beam may be projected onto a screen 367, e.g., using a projection lens 315.

According to the exemplary embodiments illustrated in FIG. 3, each of dichroic mirrors 302, 303, and 304 may be adapted to reflect a part of the light having a spectral range corresponding to one of the four primary colors, and to transmit the remaining part of the light, as is known in the art. Thus, according to these embodiments, dichroic mirrors 302, 303 and 304 may be arranged to provide each of the transmissive LCD panels with a light beam having a spectral range corresponding to one of the four primary colors, e.g., as described below.

According to exemplary embodiments of the invention, dichroic mirror 302 may be adapted to reflect a part of the polarized light beam having a spectral range corresponding to a first primary color, e.g. blue. A folding mirror 305 may be used to reflect the light beam, e.g., the blue light beam, reflected by mirror 302 towards LCD panel 309. Dichroic mirror 302 may transmit the remaining part of the light beam, whose spectral range may not cover the first primary color. Dichroic mirror 303 may be adapted to reflect a part of the light transmitted by mirror 302, having a spectral range corresponding to a second primary color, e.g. green. A folding mirror 306 may be used to reflect the light beam, e.g., the green light beam, reflected by mirror 303 towards LCD panel 310. Dichroic mirror 303 may transmit the remaining part of the light beam, whose spectral range may not cover the first and second primary colors. Dichroic mirror 304 may be adapted to reflect a part of the light transmitted by mirror 303, having a spectral range corresponding to a third primary color, e.g. yellow, towards LCD panel 311. Dichroic mirror 304 may transmit the remaining part of the light beam, which may have a spectral range substantially corresponding to a fourth primary color, e.g. red. A folding mirror 307 and a folding mirror 308 may be arranged to reflect the light beam transmitted by mirror 304 towards LCD panel 312.

Each of LCD panels 309, 310, 311 and 312 may include an array of pixels, as is known in the art, which may be selectively activated to produce a transmissive pattern corresponding to one of a plurality of primary color images. In the example described herein, each transmissive LCD panel may be separately activated by a controller 369 to produce a transmissive pattern corresponding to one of four independent primary color images, in accordance with an input signal representing a four-primary-color image. Such an input signal may be generated using any of the methods described in the above-referenced US Patent Application and/or the International Patent Application, e.g., using a converter 371 for converting a three-primary-color image signal into a four-primary-color image signal. As described below, each transmissive pattern may modulate a corresponding primary color light beam to produce a corresponding primary color image component.

Each pixel of transmissive LCD panels 309, 310, 311 and 312, when activated to an "on" state, may allow transmittance of the polarized light, as is known in the art. Accordingly, each pixel of transmissive LCD panels 309, 310, 311 and 312, when at an "off" state, may substantially block transmittance of the polarized light, as is known in the art. Thus, in accordance with these embodiments of the invention, panels 309, 310, 311 and 312 may be controlled, as described above, to produce four modulated primary color light beams, respectively, carrying four, respective, primary color image components.

According to the exemplary embodiments illustrated in FIG. 3, combining arrangement 320 may include two prism blocks, e.g., a dichroic combiner 314 and a dichroic combiner X-cube 313, as are known in the art. X-cube 313 may combine the modulated light beams produced by panels 310, 311, and 312 into a three-color light beam, e.g., by transmitting the modulated light beam produced by panel 311 and by reflecting the modulated light beams produced by panels 310 and 312. Dichroic combiner 314 may reflect the modulated light beam produced by panel 309 and may transmit the three-color light beam of X-cube 313.

Thus, arrangement 320 may direct a combination of the modulated light beams of panels 309, 310, 311 and 312 towards projection lens 315. It is noted that all of the modulated light beams may travel substantially the same distance in combining arrangement 320.

Projection lens 315 may project the combined light beam, e.g., including all four modulated color light beams, i.e., including all four primary color image components, onto viewing screen 367.

According to this exemplary embodiment, combining arrangement 320 may include six optical elements, e.g. glass elements 330 and 331 of dichroic combiner 314 and glass elements 332, 333, 334; and 335 of combining X-cube 313, as is known in the art.

Part of the discussion herein may relate, for exemplary purposes, to a combination arrangement, e.g., combination arrangement 300, including one or more prism blocks for combining four or more modulated colored light beams. However, embodiments of the invention are not limited in this regard, and may include, for example, a combination arrangement including, alternatively or additionally, one or more optical elements, optical units, optical blocks, optical surfaces, optical polarization elements, prism surfaces, prism elements, glass elements, dichroic elements, dichroic surfaces, or the like, e.g., as described below.

It will be appreciated by those skilled in the art, that there are many other possible configurations for implementing combining arrangement 320, for example, as described herein. It will be appreciated by those skilled in the art, that the number and/or arrangement of the dichroic mirrors and/or the folding mirrors and/or the LCD panels illustrated in FIG. 3 represent only one of many possible arrangements, and that any other suitable arrangement may be used, for example, the other combining arrangement configurations described herein.

Figure 4:
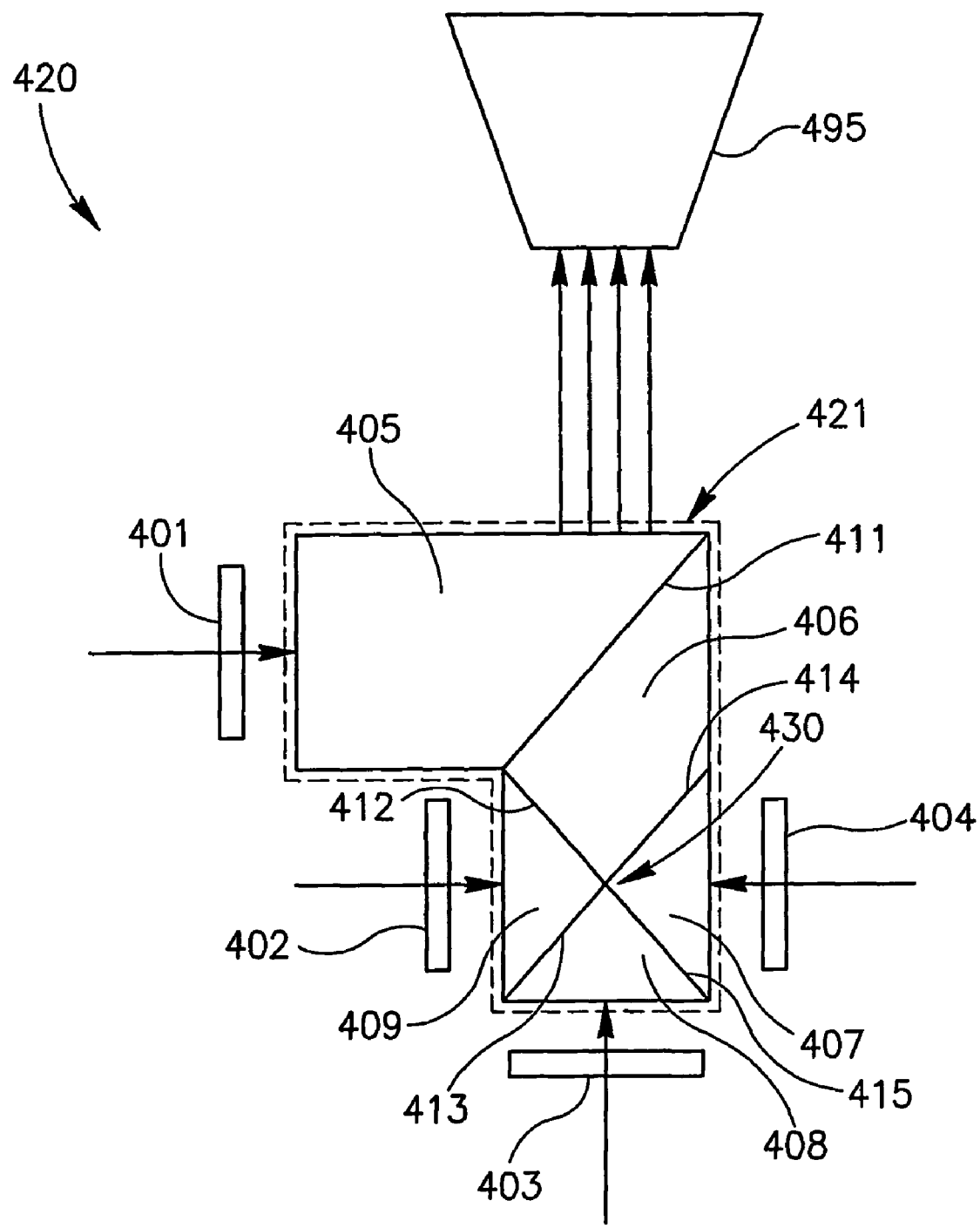
FIGS. 4, 5 and 6 are respective, schematic illustrations of three exemplary optical configurations of combining arrangements, which may be implemented by the display device of FIG. 3 in accordance with other embodiments of the invention.
Figure 5:
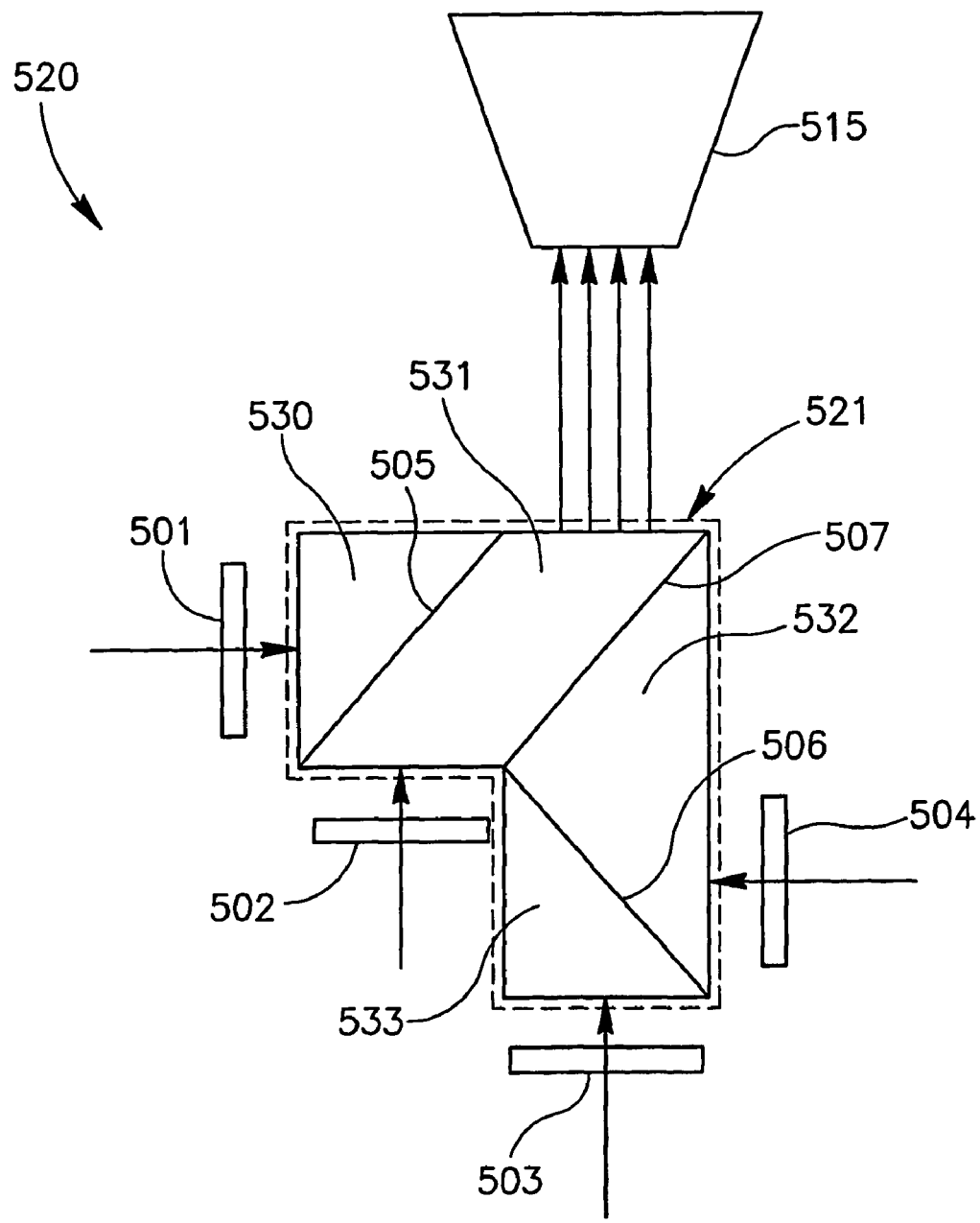
Figure 6:
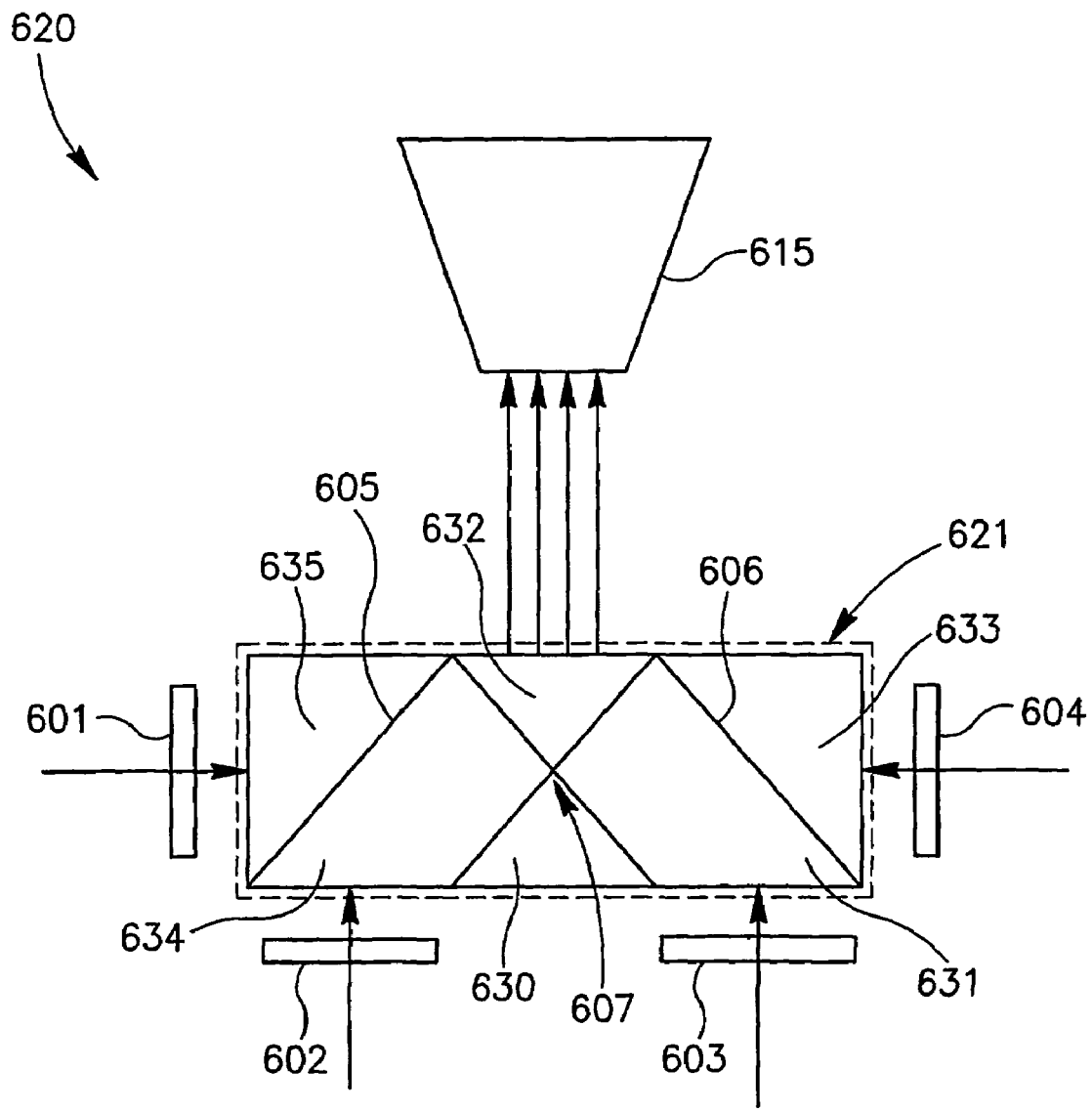

FIGS. 4, 5 and 6 schematically illustrate three alternative optical configurations, 420, 520, and 620, respectively, for implementing a combining arrangement in accordance with other exemplary embodiments of the invention.

Referring to FIG. 4, configuration 420 may include a prism block 421 to combine modulated light beams of LCD panels 401, 402, 403 and 404. Prism block 421 may include five optical elements, e.g., glass elements 405, 406, 407, 408 and 409. Each of the optical elements may have at least one dichroic-coated surface. For example, element 405 may have a dichroic-coated surface 411, element 406 may have dichroic-coated surfaces 411, 412 and 414, and elements 407, 408 and 409 may have dichroic-coated surfaces 414 and 415, 413 and 415, and 412 and 413, respectively. Thus, the modulated light beams of LCD panels 402 and 404 may be reflected by an "X-configuration" 430 formed by surfaces 412, 413, 414 and 415.

According to exemplary embodiments of the invention, the dichroic coating of each of the surfaces may correspond to dichroic coatings of dichroic mirrors 302, 303, and 304 (FIG. 3), which may be selected according to the desired primary colors, e.g., as described above with reference to FIG. 3. The modulated light beams of LCD panel 403 may be transmitted by configuration 430. Dichoroic coated surface 411 may reflect the modulated light beam of LCD panel 401 and transmit the combined light beams of X-configuration 430.

Thus, prism block 421 may direct a combination of the modulated light beams of panels 401, 402, 403 and 404 towards a projection lens 495. It is noted that all of the modulated light beams may travel substantially the same distance in prism block 421.

Referring to FIG. 5, configuration 520 may include a prism block 521 to combine modulated light beams of LCD panels 501, 502, 503 and 504. Prism block 521 may include four optical elements, e.g., glass elements 530, 531, 532 and 533 having dichroic-coated surfaces 505, 505 and 507, 506 and 507, and 506, respectively. According to this exemplary embodiment, the LCD panels and/or dichroic mirrors 302, 303, and 304 and/or any other elements of display 300 (FIG. 3) may be arranged differently than the arrangement illustrated in FIGS. 3 and 4, in order to allow the primary-color light beams, e.g., of dichroic mirrors 302, 303, and 304 (FIG. 3), to be received by the LCD panels. According to this embodiment, dichroic-coated surface 506 may combine the modulated light beams of panels 503 and 504 into a first two-color light beam, e.g., by transmitting the modulated light beam of panel 503 and reflecting the modulated light beam of panel 504. Dichroic-coated surface 505 may combine the modulated light beams of panels 501 and 502 into a second two-color light beam, e.g., by transmitting the modulated light beam of panel 501 and reflecting the modulated light beam of panel 502. Dichroic-coated surface 507 may combine the first and second two-color light beams, e.g., by transmitting the first two-color light beam and reflecting the second two-color light beam.

Thus, prism block 521 may direct a combination of the modulated light beams of panels 501, 502, 503 and 504 towards a projection a lens 515. It is noted that all of the modulated light beams may travel substantially the same distance in prism block 521.

Referring to FIG. 6, configuration 620 may include a prism block 621 to combine modulated light beams of LCD panels 601, 602, 603 and 604. According to this exemplary embodiment, LCD panels 601, 602, 603 and 604, dichroic mirrors 302, 303, and 304 (FIG. 3), and/or any other elements of display 300 (FIG. 3) may be arranged differently than the arrangement illustrated in FIGS. 3 and 4, e.g., in order to allow the primary color light beams, e.g., of, the dichroic mirrors, to be received by the LCD panels. Prism block 621 may include six optical elements, e.g., glass elements 630, 631, 632, 633, 634 and 635, each having at least one dichroic-coated surface. Accordingly, prism block 621 may include two dichroic-coated surfaces, 605 and 606, and an X-cube dichroic coating configuration 607 including dichroic-coated surfaces of elements 630, 631, 632 and 634. Dichroic-coated surface 605 may combine the modulated light beam of panels 601 and 602 into a first two-color light beam, e.g., by transmitting the modulated light beam of panel 601 and reflecting the modulated light beam of panel 602. Dichroic-coated surface 606 may combine the modulated light beams of panels 603 and 604 into a second two-color light beam, e.g., by transmitting the modulated light beam of panel 604 and reflecting the modulated light beam of panel 603. Coating configuration 607 may combine the first and second two-color light beams, e.g., by reflecting the light beams produced by surfaces 605 and 606.

Thus, prism block 621 may direct a combination of the modulated light beams of panels 601, 602, 603 and 604 towards a projection lens 615. It is noted that all of the modulated light beams may travel substantially the same distance in the prism block 621.

Figure 7:
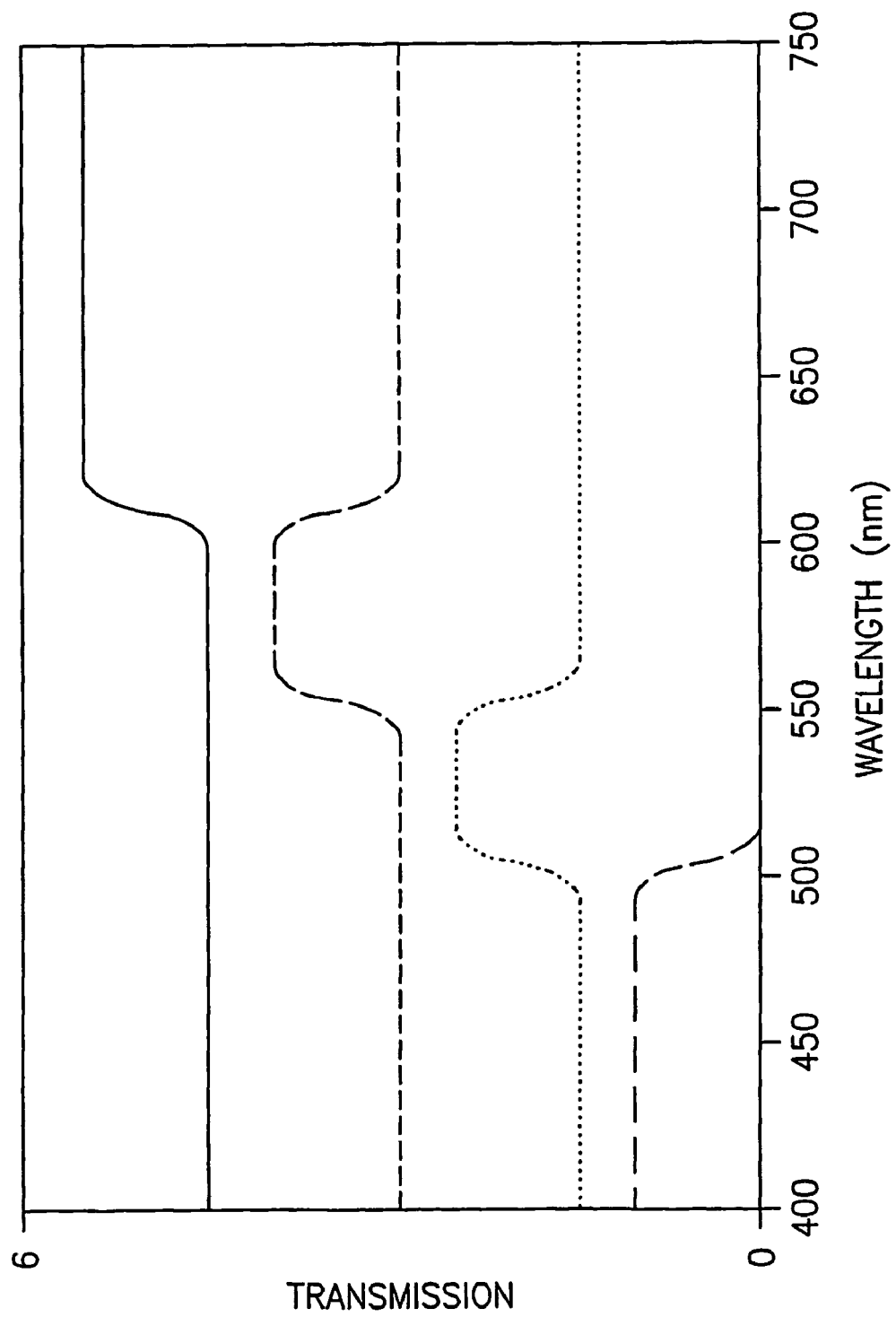
FIG. 7 is a schematic illustration of graphs of four exemplary primary color wavelength spectra, which may be implemented by display device of FIG. 3.

FIG. 7 schematically illustrates graphs of four exemplary primary color wavelength spectra, which may, be implemented by a color display including the combining arrangement of FIG. 3, FIG. 4, FIG. 5 or FIG. 6.

FIG. 7 shows the wavelength spectra of a set of four primary colors, which may be produced by dichroic coatings, for example, coatings of dichroic mirrors 302, 303 and 304 of FIG. 3, and/or of the dichroic-coated surfaces of FIGS. 3, 4, 5, and/or 6.

According to embodiments of the invention, the specific color choices of the primary color wavelength ranges shown in FIG. 7 may result in a significantly wider color gamut and/or image brightness, compared to prior art RGB color display devices, as described below.

Figure 8:
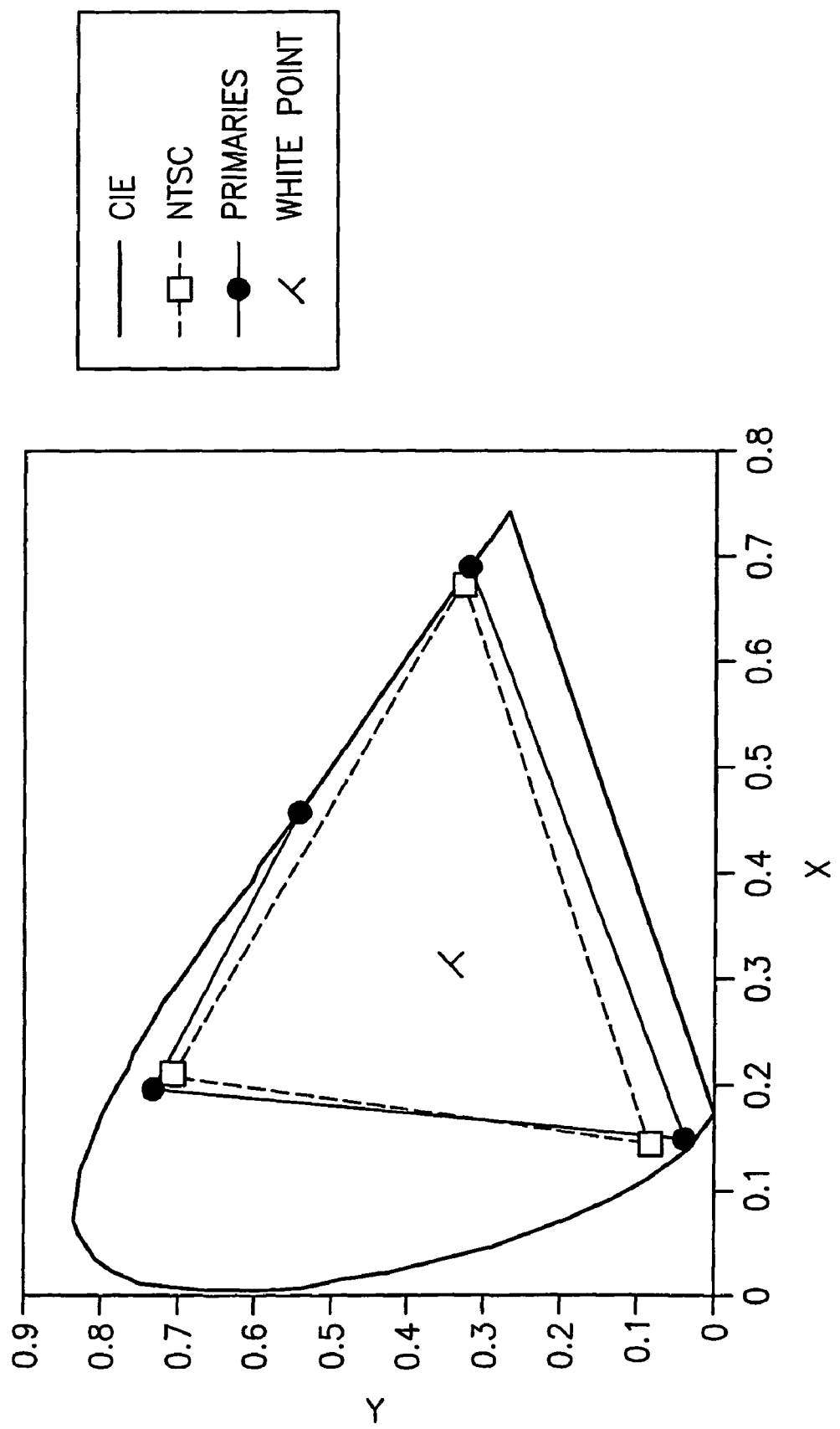
FIG. 8 is a schematic illustration of a chromaticity diagram representing a color gamut resulting from the primary color spectra of FIG. 7.

FIG. 8 schematically illustrates a chromaticity diagram representing the resulting color gamut of the primary color spectra of FIG. 7.

As clearly shown in FIG. 8, the color gamut produced by a theoretical NTSC gamut display is substantially covered by the gamut of the four primary colors of FIG. 7. As further shown in FIG. 8, the white point coordinates obtained by the sum of all primaries are $x=0.312$ and $y=0.345$. The luminance values for the colors obtained by this configuration are in general equal to or higher than the luminance values that can be obtained for the same colors from a theoretical NTSC gamut display. Thus, in general, all the colors that can be reproduced by a theoretical NTSC gamut display are also reproducible by the primary color selections of FIG. 7, both in terms of color coordinates and in terms of intensity.

It should be appreciated that although the primary color selections of FIG. 7 provide desirable results in terms of image color and brightness, there may be other suitable selections of four primary colors that provide similar (or even better) results, in accordance with specific implementations.

According to another exemplary embodiment of the invention, there is provided a device for combining five primary colors, e.g. blue, cyan, green, yellow and red, for a wide gamut display using five transmissive LCD panels, wherein each panel may produce one primary color. According to this embodiment, such combination of five primary colors may allow further expansion of the color gamut, compared to the four-primary combination described above, without significant loss of brightness.

Figure 9:
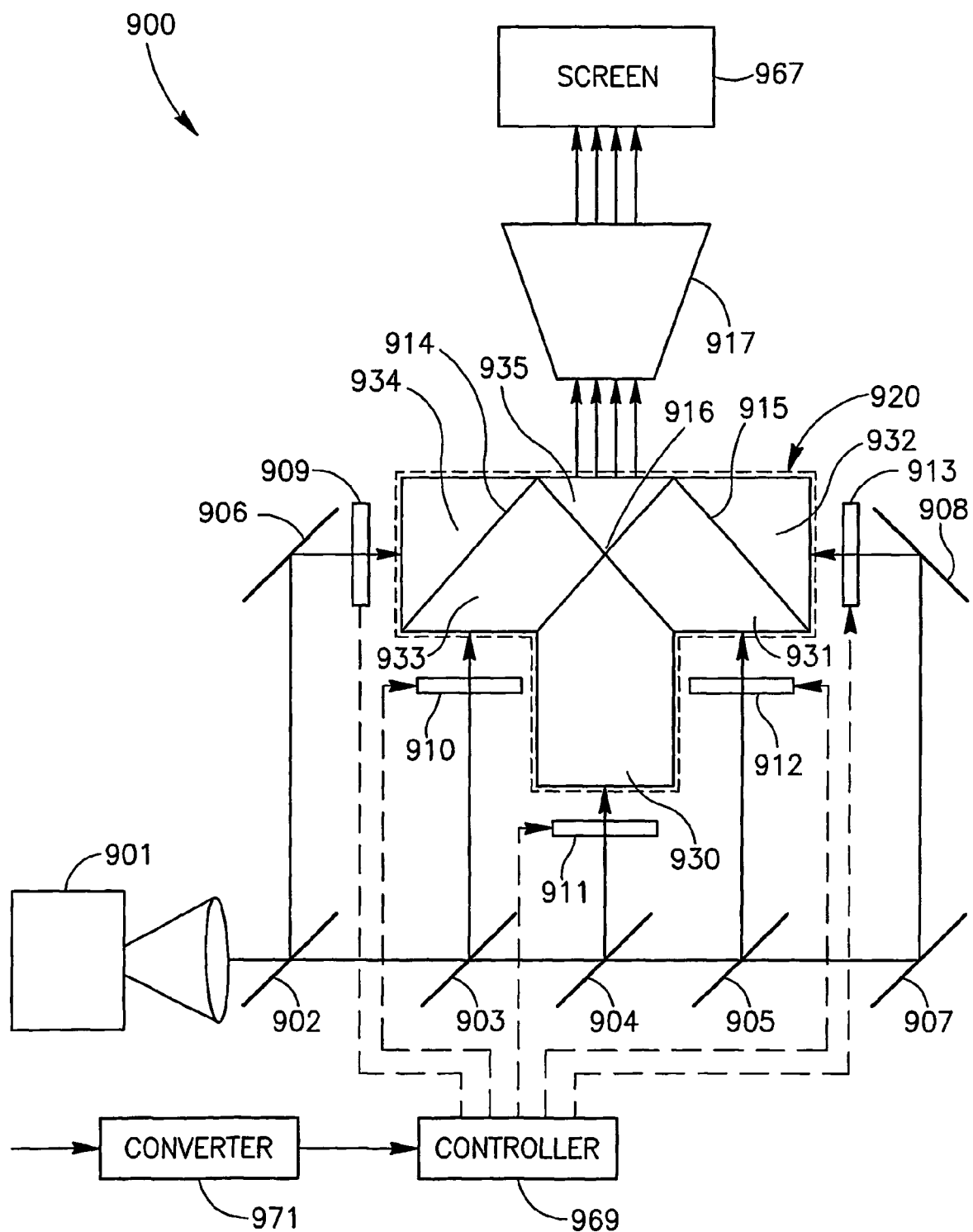
FIG. 9 is a schematic illustration of an optical configuration of a five primary color display device including a combining arrangement in accordance with exemplary embodiments of the invention.

FIG. 9 schematically illustrates an optical configuration of a five-primary display device 900 in accordance with exemplary embodiments of the invention.

According to exemplary embodiments, device 900 may include an illumination unit 901, which may include any suitable light source as is known in the art, e.g., a white light source as described above. Illumination unit 901 may also include a polarization conversion element (not shown) as is known in the art, to provide a desired linear polarized light beam.

Device 900 may also include an arrangement, e.g., including dichroic mirrors 902, 903, 904 and 905, and folding mirrors 906, 907 and 908, for splitting the light of illumination unit 901 into five primary-color light beams and directing, e.g., reflecting the five light beams onto five transmissive SLMs, e.g., five transmissive LCD panels 909, 910, 911, 912, and 913, as described below.

It will be appreciated by those skilled in the art that that any other arrangement may be used for producing and/or spatially modulating the five primary-color light beams. For example, any suitable: SLM may be used instead of LCD panels 909, 910, 911, 912, and/or 913. Additionally or alternatively, any suitable splitting arrangement may be implement to split the light of illumination unit 901 into two or more of the five primary-color light beams and/or to direct the primary color light beams onto the SLMs.

Device 900 may additionally include a combining arrangement 920 to combine modulated light beams produced by panels 909, 910, 911, 912, and 913, as described below. The combined light from arrangement 920 may be projected onto a screen 967, e.g. by a projection lens 917.

According to the exemplary embodiments illustrated in FIG. 9, each of dichroic mirrors 902, 903, 904 and 905 may be adapted to reflect a part of a received light beam having a spectral range corresponding to one of the five primary colors, and to transmit the remaining part of the light. Thus, in analogy to the above description of the four-primary display of FIG. 3, dichroic mirrors 902, 903, 904 and 905, and folding mirrors 906, 907 and 908, may be, arranged to provide each of LCD panels 909, 910, 911, 912, and 913 with a respective light beam having a spectral range corresponding to one of the five primary colors.

Each of LCD panels 909, 910, 911, 912, and 913 may include an array of pixels, as is known in the art, which may be selectively activated to produce a transmissive pattern corresponding to one of a plurality of primary color images, as described above with reference to FIG. 3. Thus, in analogy to the above description of the panels of the four-primary display of FIG. 3, panels 909, 910, 911, 912, and 913 may be controlled, e.g., using a controller 969 and/or a converter 971, to produce five modulated primary color light beams, respectively, carrying five, respective, primary color image components.

According to the exemplary embodiments as illustrated in FIG. 9, combining arrangement 920 may include optical elements, e.g., glass elements 930, 931, 932, 933, 934 and 935. Each of the glass elements may have at least one dichroic-coated surface, as described above. Thus arrangement 920 may include an X-cube dichroic coating configuration 916 and dichroic-coated surfaces 914 and 915 of elements 934 and 932, respectively. Surface 914 may combine the modulated light beams of panels 909 and 910 into a first two-color light beam, e.g., by transmitting the modulated light beam of panel 909 and reflecting the modulated light beam of panel 910. Surface 915 may combine the modulated light beams of panels 913 and 912 into a second two-color light beam, e.g., by transmitting the modulated light beam of panel 913 and reflecting the modulated light beam of panel 912. Dichroic coating configuration 916 may combine the modulated light beam of panel 911 and the first and second two-color light beams, e.g., by transmitting the modulated light beam of panel 911 and reflecting the modulated light beams of surfaces 914 and 915.

Thus, combining arrangement 920 may transmit a combination of the modulated light beams of panels 909, 910, 911, 912, and 913 towards projection lens 917. It is noted that all of the modulated light beams may travel substantially the same distance in combining arrangement 920.

The projection lens may project all five modulated colored light beams, i.e., all five primary color image components, onto viewing screen 967.

It will be appreciated by those skilled in the art, that there are many other possible configurations for implementing combining arrangement 920. It will be appreciated by those skilled in the art, that the number and/or arrangement of the dichroic mirrors and/or the folding mirrors and/or the LCD panels illustrated in FIG. 9 represent only one of many possible arrangements, and that any other suitable arrangement may be used.

Figure 10:
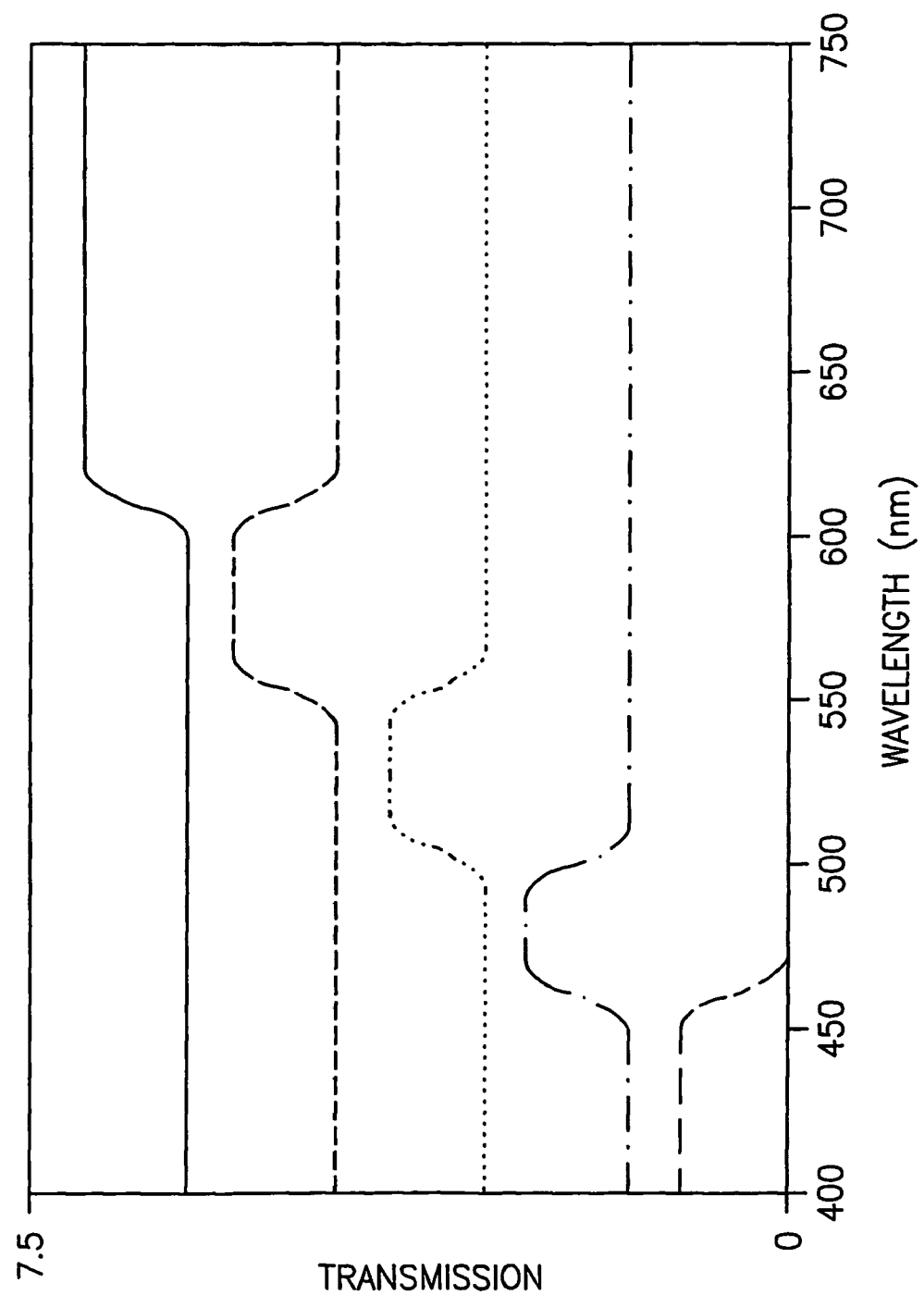
FIG. 10 is a schematic illustration of graphs of five exemplary primary color wavelength spectra, which may be implemented by the display device of FIG. 9.

FIG. 10 schematically illustrates graphs of five exemplary primary color wavelength spectra, which may be implemented by a color display using the configuration of FIG. 9. FIG. 10 shows the wavelength spectra of a set of five primary colors, which may be produced, for example, by dichroic-coatings, e.g. coatings of dichroic mirrors 902, 903, 904 and 905 of FIG. 9, and/or the dichroic-coated surfaces of combining arrangement 920 of FIG. 9.

According to embodiments of the invention, the specific color choices of the primary color wavelength ranges shown in FIG. 10 may result in a significantly wider color gamut and/or image brightness compared to prior art RGB color display devices, as described below.

Figure 11:
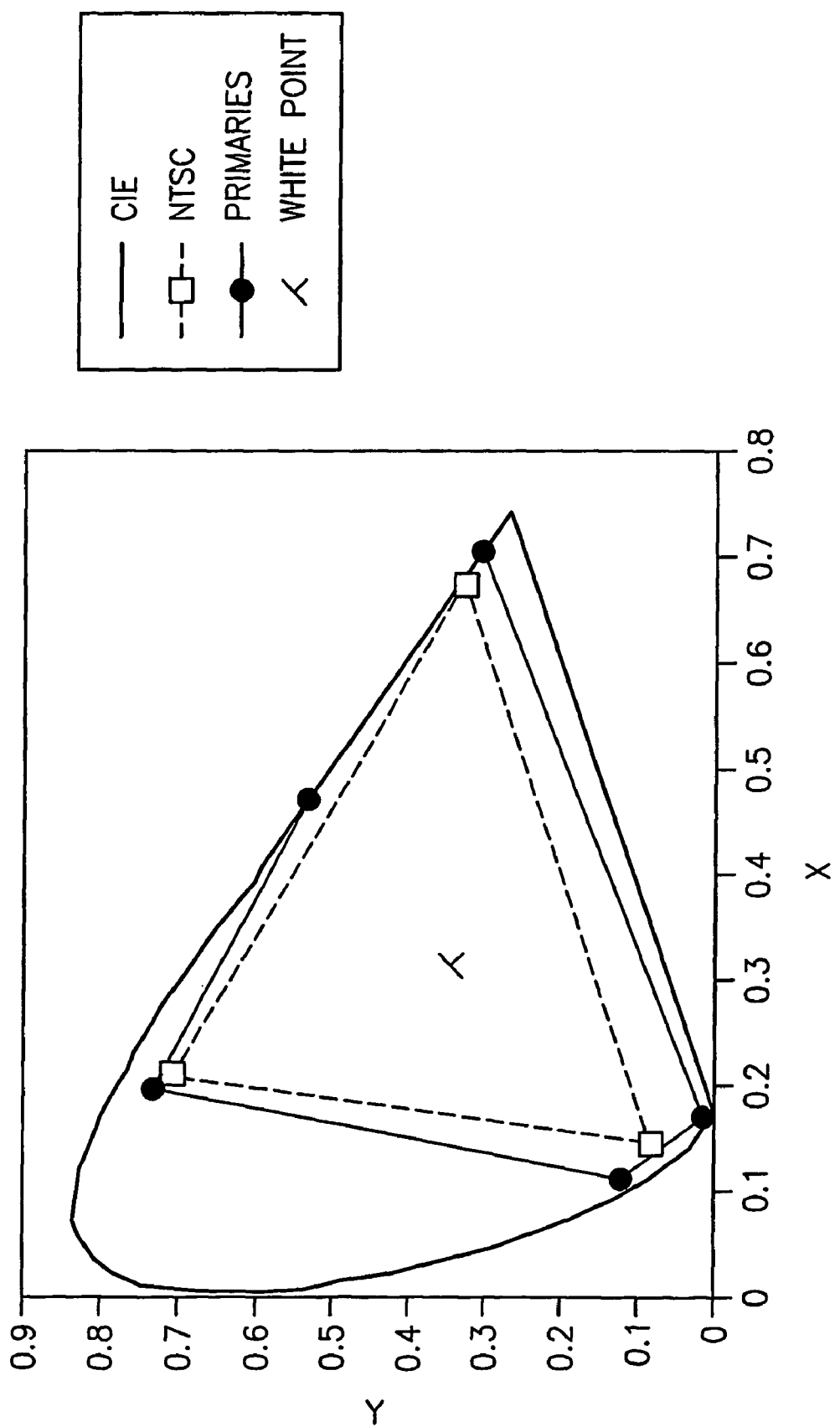
FIG. 11 is a schematic illustration of a chromaticity diagram representing a color gamut resulting from the primary color spectra of FIG. 10.

FIG. 11 schematically illustrates a chromaticity diagram representing the resulting color gamut of the primary color spectra of FIG. 10. As clearly shown in FIG. 11, the color gamut produced by a theoretical NTSC gamut display is substantially covered by the gamut of the four primary colors of FIG. 10. As further shown in FIG. 11, the white point coordinates obtained by the sum of all primaries are x=0.310 and y=0.344. The luminance values for the colors obtained by this configuration are in general equal to or higher than the luminance values that can be obtained for the same colors from a theoretical NTSC gamut display. Thus, in general, all the colors that may be reproduced by a theoretical NTSC gamut display are also reproducible by the primary color selections of FIG. 10, both in terms of color coordinates and in terms of intensity.

It should be appreciated that although the primary color selections of FIG. 10 provide desirable results in terms of image color and brightness, there may be other suitable selections of four primary colors that provide similar (or even better) results, in accordance with specific implementations.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

The invention claimed is:

1. A display device for producing a color image using four or more primary colors, comprising:

four or more transmissive spatial light modulators to modulate four or more, respective, light beams in accordance with four or more, respective, primary color image components of said color image to produce four or more, respective, modulated light beams; and a prism block combiner to combine said four or more modulated light beams into a combined light beam.

2. The device of claim 1, wherein said prism block combiner comprises:

an X-cube to combine three of said four or more modulated light beams into a three-color light beam; and a dichroic cube to combine a fourth modulated light beam of said four or more modulated light beams with said three-color light beam.

3. The device of claim 2, wherein said X-cube comprises two dichroic-coated surfaces, and wherein said dichroic cube comprises a dichroic-coated surface.

4. The device of claim 1, wherein said prism block combiner includes five optical elements, each optical element having at least one dichroic-coated surface.

5. The device of claim 1, wherein said prism block combiner comprises:
   a first dichroic-coated surface to combine first and second modulated light beams of said four or more modulated light beams into a first two-color light beam; and
   a second dichroic-coated surface to combine third and fourth modulated light beams of said four or more modulated light beams into a second two-color light beam.

6. The device of claim 5, wherein said prism block combiner comprises a third dichroic-coated surface adapted to combine said first and second two-color light beams.

7. The device of claim 1, wherein at least one of said transmissive spatial light modulators comprises a transmissive liquid crystal display panel.

8. The device of claim 1, wherein said four or more light beams comprise four or more, respective, primary color light beams having spectral ranges corresponding to said four or more primary colors, respectively.

9. The device of claim 1 comprising a spectrum-splitting arrangement to split light of an illumination source into said four or more primary color light beams.

10. The device of claim 9, wherein said spectrum-splitting arrangement comprises a plurality of dichroic mirrors to separate light of said illumination source into said four or more primary color light beams.

11. The device of claim 8 comprising one or more folding mirrors to direct one or more of said four or more primary color light beams onto one or more of said transmissive spatial light modulators.

12. The device of claim 1, wherein said four more modulated light beams travel substantially the same distance in said prism block combiner.

13. The device of claim 1 comprising a projection lens to project said combined light beam onto a screen.

14. The device of claim 1 comprising a controller able to separately activate said spatial light modulators to produce a four or more transmissive patterns corresponding to four or more primary components, respectively, of a signal representing said color image.

15. The device of claim 14 comprising a converter to convert a three-primary color input signal into the signal representing said color image.

16. A method of producing a color image using four or more primary colors comprising:
   modulating four or more primary color light beams using four, respective, transmissive spatial light modulators in accordance with four or more, respective, primary color image components of said color image to produce four or more, respective, modulated light beams; and
   combining said four or more modulated light beams by a prism block combiner to produce a combined light beam.

17. The method of claim 16, comprising splitting light of an illumination source into said four or more primary color light beams.

18. The method of claim 16, wherein combining said four or more modulated light beams comprises:
   combining three of said four or more modulated light beams into a three-color light beam; and
   combining a fourth modulated light beam of said four or more modulated light beams and said three-color light beam into said combined light beam.

* * * * *